United States Patent

Ho

[11] Patent Number: 6,120,117
[45] Date of Patent: Sep. 19, 2000

[54] COVER PLATE AND COMPUTER METAL SHELL ARRANGEMENT

[76] Inventor: Hsin Chien Ho, 20-1F, 268, Sec. 1, Wen-Hua Rd., Pan Chiao City, Taipei, Taiwan

[21] Appl. No.: 09/283,330

[22] Filed: Mar. 31, 1999

[51] Int. Cl.[7] ................................................ A47B 97/00
[52] U.S. Cl. ................................. 312/223.2; 312/265.6
[58] Field of Search ............................ 312/265.5, 265.6, 312/223.1, 223.2, 293.3; 211/26, 41.17; 361/683, 726; 292/17

[56] References Cited

U.S. PATENT DOCUMENTS

| | | | |
|---|---|---|---|
| 3,164,432 | 1/1965 | Feigenbaum | 312/223.1 |
| 3,192,306 | 6/1965 | Skonnord | 312/265.5 X |
| 4,602,829 | 7/1986 | De Andrea | 312/223.1 |
| 4,745,524 | 5/1988 | Patton, III | 361/683 |
| 5,076,619 | 12/1991 | Chi | 292/17 |
| 5,209,356 | 5/1993 | Chaffee | 211/26 |
| 5,406,809 | 4/1995 | Igelmund | 292/281 X |
| 5,571,256 | 11/1996 | Good et al. | 312/223.1 X |
| 5,575,546 | 11/1996 | Radloff | 312/223.1 X |
| 5,576,935 | 11/1996 | Freer et al. | 211/41.17 X |
| 5,791,498 | 8/1998 | Mills | 312/223.2 X |
| 5,820,171 | 10/1998 | Albani et al. | 292/17 |
| 5,909,359 | 6/1999 | Summers et al. | 312/223.2 X |

*Primary Examiner*—Peter R. Brown
*Assistant Examiner*—James O. Hansen
*Attorney, Agent, or Firm*—Dougherty & Troxell

[57] ABSTRACT

A cover plate and computer metal shell arrangement, which includes a computer metal shell having at least one apparatus insertion slot, and a cover plate detachably covered on each of the at least one apparatus slot, the computer metal shell having two screw holes spaced at one side of each of the at least one apparatus insertion slot; the cover plate has two extending lugs the lugs each having a locating device for connection to the screw holes adjacent to the corresponding apparatus insertion slot by a respective screw, which locating device can be a smoothly arched end notch or a round hole.

8 Claims, 2 Drawing Sheets

COVER PLATE AND COMPUTER METAL SHELL ARRANGEMENT

BACKGROUND OF THE INVENTION

The present invention relates to a cover plate and computer metal shell arrangement which enables the detached cover plate to be installed in the computer metal shell to close the corresponding apparatus insertion slot.

When a computer metal shell is made, cover plates are formed in the body of the computer metal shell by punching. When installing an apparatus for example a CD-ROM driver or disk driver, one cover plate is detached from the computer metal shell, enabling an apparatus insertion slot to be presented at the computer metal shell. However, when a cover plate is detached from the computer metal shell, it becomes useless, and cannot be installed in the computer metal shell again.

SUMMARY OF THE INVENTION

The present invention eliminates the aforesaid problem. According to one aspect of the present invention, the cover plate and computer metal shell arrangement includes a computer metal shell having at least one apparatus insertion slot, and a cover plate detachably covered on each of the at least one apparatus slot, wherein the computer metal shell comprises two screw holes spaced at one side of each of the at least one apparatus insertion slot; the cover plate has two lugs respectively extended from one side thereof, the lugs each having locating means for connection to the screw holes adjacent to the corresponding apparatus insertion slot by a respective screw. According to another aspect of the present invention, the locating means can be a smoothly arched end notch or round hole. After removal of the cover plate, it can be fastened to the computer metal shell to close the apparatus insertion slot again, so as to prevent an electromagnetic interference.

DETAILED DESCRIPTION OF THE PREFERRED EMBODIMENT

Figure 1:
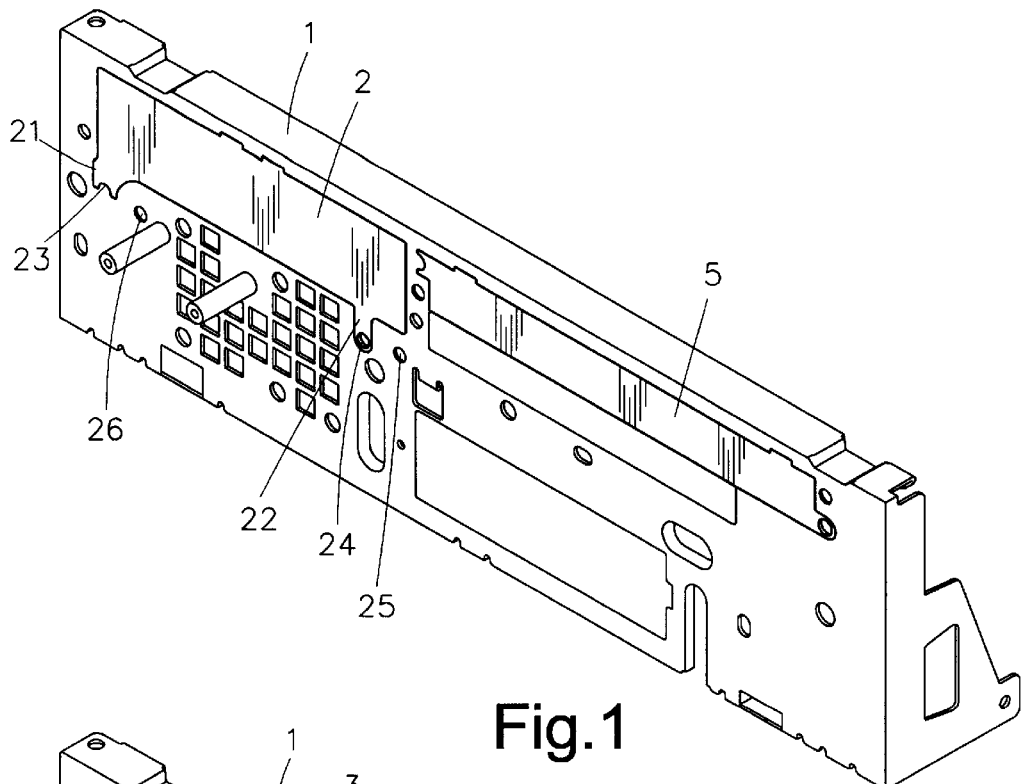
FIG. 1 is a perspective front view of the present invention.
Figure 2:
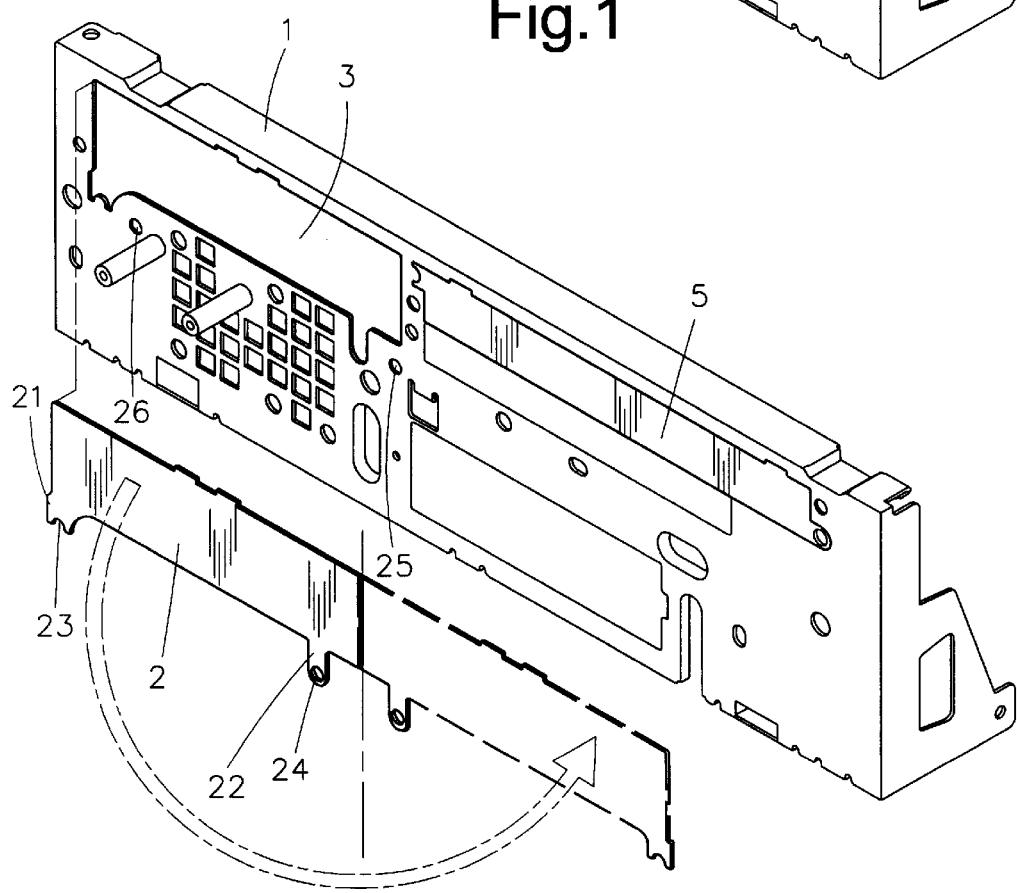
FIG. 2 shows one cover plate removed from the computer metal shell and turned through 180° angle.
Figure 3:
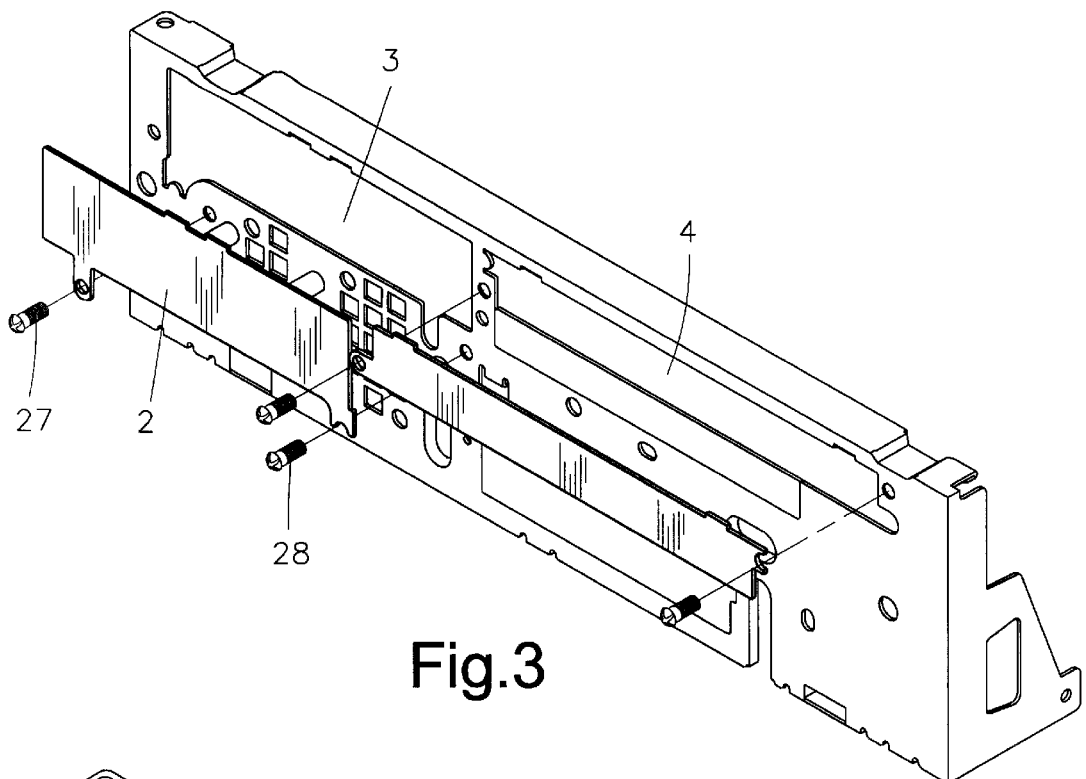
FIG. 3 shows re-installation of the detached cover plate according the present invention.
Figure 4:
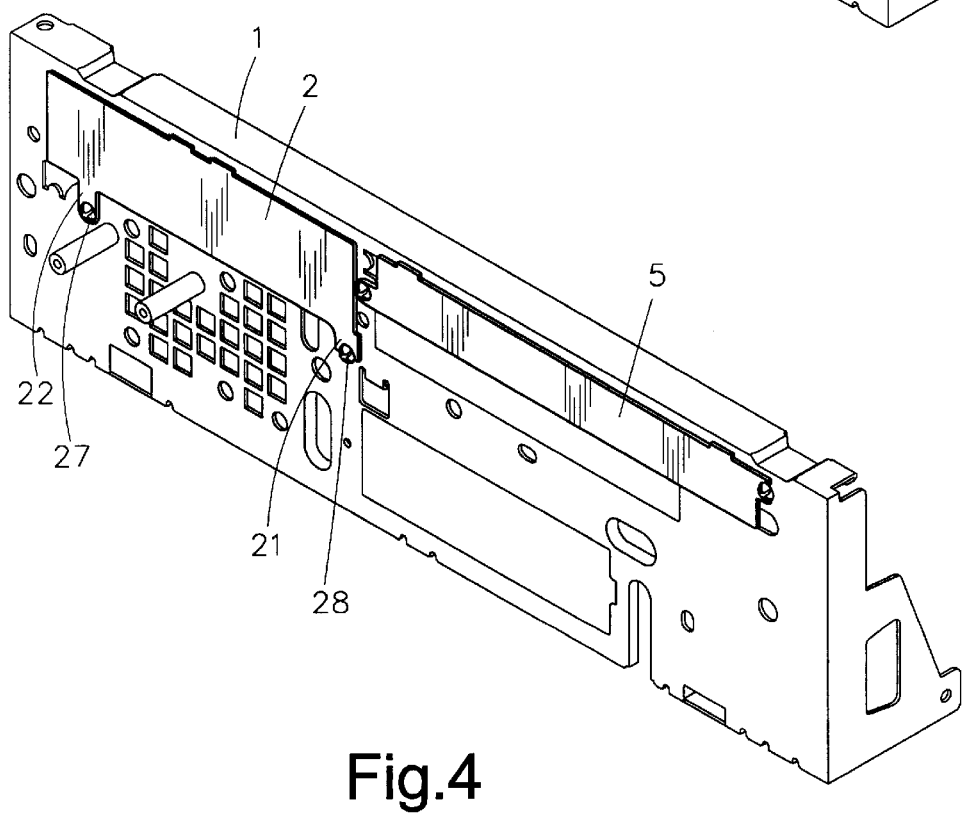
FIG. 4 shows the detached cover plate fastened to the computer metal shell again.

Referring to FIG. 1, a cover plate 2 or 5 is detachably covered on a computer metal shell 1. The cover plate 2 or 5 comprises a first lug 21 and a second lug 22 extended from its one side. The first lug 21 has a smoothly arched end notch 23. The second lug 22 has a round hole 24. The computer metal shell 1 comprises two screw holes 25 and 26 spaced along one side of each slot for CD-ROM driver, floppy disk driver, or hard disk driver (not shown).

Referring to FIGS. from 2 through 4, when installing a CD-ROM driver, floppy disk driver or hard disk driver in one slot 3 or 4 at the computer metal shell 1, the cover plate 2 or 5 is detached from the computer metal shell 1 for enabling a CD-ROM driver, floppy disk driver or hard disk driver to be installed in the selected slot 3 or 4. If the slot 3 or 4 has to be closed again, the cover plate 2 or 5 is turned through 180° angle, and then attached to the front side of the computer metal shell 1, enabling the round hole 24 and the smoothly arched end notch 23 to be respectively secured to the screw holes 26 and 25 by screws 27 and 28 to prevent EMI (electromagnetic interference).

As an alternate form of the present invention, the first lug 21 can be made having a round hole instead of the aforesaid smoothly arched end notch 23. Further, the lugs 21 and 22 can be provided at either of the four sides of each lug 21 or 22.

What the invention claimed is:

1. A cover plate arrangement for a computer, comprising:
   a) a metal computer shell having at least one accessory apparatus installation opening, the at least one opening having opening height and opening width dimensions;
   b) a cover plate removably connected to the metal shell, the cover plate having plate height and plate width dimensions no greater than the opening height and opening width dimensions, the cover plate having at least first and second lugs extending therefrom, the cover plate being movable between a first position wherein the at least first and second lugs are located within the at least one opening, and a second position wherein the at least first and second lugs extend beyond the at least one opening; and,
   c) at least first and second attachment openings in the metal shell, each opening located so as to be aligned with one of the at least first and second lugs when the cover plate is in the second position, to accommodate a fastening device engaging the lug so as to attach the at least one cover plate to the metal shell in the second position.

2. The cover plate arrangement of claim 1 wherein the at least one cover plate has a first surface facing in a first direction when the at least one cover plate is in the first position, and which faces in a second, opposite direction when the cover plate is in the second position.

3. The cover plate arrangement of claim 1 wherein the at least one cover plate includes a plurality of edges and wherein the at least first and second lugs extend from the same edge.

4. The cover plate arrangement of claim 1 wherein the at least one cover plate includes a plurality of edges and wherein the at least first and second lugs extend from different edges.

5. The cover plate arrangement of claim 1 wherein at least one of the at least first and second lugs includes one arcuate end notch.

6. The cover plate arrangement of claim 1 wherein at least one of the at least first and second lug includes a hole therethrough.

7. The cover plate arrangement of claim 1 comprising first and second lugs, one of the first and second lugs having an arcuate end notch and the other of the first and second lugs having a hole therethrough.

8. The cover plate arrangement of claim 1 comprising first and second lugs wherein each lug has a hole therethrough.

* * * * *